US009147992B2

(12) United States Patent
Peng et al.

(10) Patent No.: US 9,147,992 B2
(45) Date of Patent: Sep. 29, 2015

(54) HIGH EFFICIENCY AMPLIFICATION OF PULSED LASER OUTPUT FOR HIGH ENERGY ULTRAFAST LASER SYSTEMS

(71) Applicant: Raydiance, Inc., Petaluma, CA (US)

(72) Inventors: Xiang Peng, Hercules, CA (US);
Kyungbum Kim, Santa Rosa, CA (US);
Michael M. Mielke, Santa Rosa, CA (US)

(73) Assignee: Coherent, Inc., Santa Clara, CA (US)

( * ) Notice: Subject to any disclaimer, the term of this patent is extended or adjusted under 35 U.S.C. 154(b) by 13 days.

(21) Appl. No.: 13/673,939

(22) Filed: Nov. 9, 2012

(65) Prior Publication Data

US 2014/0133503 A1    May 15, 2014

(51) Int. Cl.
| | |
|---|---|
| H01S 3/067 | (2006.01) |
| H01S 3/16 | (2006.01) |
| H01S 3/094 | (2006.01) |
| H01S 3/17 | (2006.01) |
| H01S 3/042 | (2006.01) |

(52) U.S. Cl.
CPC ......... *H01S 3/06716* (2013.01); *H01S 3/06754* (2013.01); *H01S 3/042* (2013.01); *H01S 3/06712* (2013.01); *H01S 3/06741* (2013.01); *H01S 3/06745* (2013.01); *H01S 3/094007* (2013.01); *H01S 3/1608* (2013.01); *H01S 3/175* (2013.01)

(58) Field of Classification Search
CPC . H01S 3/067; H01S 3/06716; H01S 3/06741; H01S 3/1007; H01S 3/1603; H01S 3/1608; H01S 3/1616; H01S 3/161
USPC .................................................. 372/6, 39, 40
See application file for complete search history.

(56) References Cited

U.S. PATENT DOCUMENTS

| | | | |
|---|---|---|---|
| 4,815,079 A * | 3/1989 | Snitzer et al. | 372/6 |
| 6,608,951 B1 * | 8/2003 | Goldberg et al. | 385/43 |
| 2003/0152115 A1 * | 8/2003 | Jiang et al. | 372/6 |
| 2010/0157418 A1 * | 6/2010 | Dong et al. | 359/341.3 |
| 2011/0069723 A1 * | 3/2011 | Dong et al. | 372/6 |
| 2014/0044139 A1 * | 2/2014 | Dong et al. | 372/6 |
| 2014/0140361 A1 * | 5/2014 | Jiang | 372/6 |

* cited by examiner

*Primary Examiner* — Armando Rodriguez
(74) *Attorney, Agent, or Firm* — Morrison & Foerster LLP (57) ABSTRACT

Systems and methods of high efficiency amplification of pulsed laser output for high energy ultra-short pulse laser systems are provided herein. According to some embodiments, methods for amplifying pulsed laser output for high energy ultra-short pulse laser systems include receiving pulsed laser output and amplifying the pulsed laser output by propagating the pulsed laser output through a non-silica based gain medium that has been doped with a concentration of rare earth ions, wherein the concentration of the rare earth ions within the gain medium is approximately greater than one percent by weight.

33 Claims, 12 Drawing Sheets

HIGH EFFICIENCY AMPLIFICATION OF PULSED LASER OUTPUT FOR HIGH ENERGY ULTRAFAST LASER SYSTEMS

GOVERNMENT LICENSE RIGHTS

This invention was made with Government support under N00164-11-C-BT07 awarded by Naval Surface Warfare Center Crane Division. The Government has certain rights in the invention.

BACKGROUND

Field of the Invention

The present technology relates generally to amplification of pulse laser output for high energy ultrafast laser systems, and more specifically, but not by way of limitation, to systems and methods for high efficiency amplification of pulsed laser output for high energy ultrafast laser systems.

SUMMARY OF THE PRESENT TECHNOLOGY

According to some embodiments, the present technology may be directed to methods for amplifying pulsed laser output for high energy ultrafast laser systems. These methods may include: (a) receiving pulsed laser output; and (b) amplifying the pulsed laser output by propagating the pulsed laser output through a non-silica based gain medium that has been doped with a concentration of a rare earth ion, such as Erbium, Ytterbium, and/or Thulium, wherein the concentration of the rare earth ion within the gain medium is approximately greater than one percent by weight.

According to additional embodiments, the present technology may be directed to high efficiency optical amplifiers. In some embodiments, these amplifiers may include: (a) an active core comprising a non-silica based gain medium, the gain medium being doped with a concentration of a rare earth ion, wherein the concentration of the rare earth ion within the gain medium is approximately greater than one percent by weight; and (b) a cladding that at least partially surrounds the active core.

According to other embodiments, the present technology may be directed to ultrafast pulsed laser assemblies. These assemblies may include: (a) a signal and pump combiner for coupling a signal with a pulsed laser output and a pump with high power; (b) a spatial mode converter that receives pulsed laser output from the combiner, the spatial mode converter capable of converting the pulsed laser output between a fundamental mode and another fundamental and higher order mode; and (c) an optical waveguide having a gain medium that has been doped with a concentration of a rare earth ion, wherein the concentration of the rare earth ion within the gain medium is approximately greater than one percent by weight; and (d) an endcap that expands the pulsed laser output in order to raise the optical irradiance related damage threshold.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

DETAILED DESCRIPTION

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

Generally speaking, the present technology is directed to high efficiency amplification of ultra-short pulse laser output, hereinafter referred to as ("USP"). An ultra-short pulse laser may also be referred to as an ultrafast laser. These terms generally describe laser emission in the form of very brief pulses where the laser pulse duration full-width-at-half-maximum (FWHM) is less than about 10 picoseconds (ps), and preferably less than about 1 ps, i.e. in the range of hundreds of femtoseconds (fs) or less.

USP lasers are compelling due to the unique interaction between the extremely short pulses of light generated by the USP lasers and the work material. Traditional materials modification applications rely upon very high average power with continuous wave ("CW") lasers to induce catastrophic thermal effects or very high pulse energy with pulsed lasers to induce dielectric breakdown or other peak power driven events. In contrast, USP lasers—where the pulse duration is approximately less than about a picosecond—readily invoke highly desirable modifications to objects of interest with relatively low average power and pulse energy. This is an inherent benefit of the USP laser pulse peak power and relative brevity in pulse duration as compared with continuous wave laser systems or longer pulse laser systems.

USP laser induced effects are characterized by a pulse energy density, or fluence, threshold that is required to initiate desired physical phenomena within an object, such as ablation and singulation. Many applications require higher average power than is presently available to meet reasonable processing speed or throughput requirements. Sustaining the needed fluence and time-averaged irradiance (e.g., end-use of laser minimum energy fluence/average power needed to gain a specific manufacturing throughput) at a given remote distance from a material processing work zone imposes certain performance specifications back on the laser source.

USP fiber laser systems are limited in output pulse energy by the temporal pulse distortion caused by self-phase modulation (SPM) as the pulses propagate through the system amplifiers (e.g., standard silica-based optical amplifiers). The magnitude of SPM is quantified by the B-integral value, which is proportional to both the beam irradiance inside the amplifier and the propagation length of the amplifier. Common amplifiers are comprised of optical fibers which may feature small diameter waveguides to retain single mode characteristics. Unfortunately, inherent disadvantages with respect to reducing irradiance (during amplification) exist for these amplifiers as compared to laser rod or thin disk geometry amplifiers. Nonetheless, the overwhelming advantages of USP fiber systems offer compelling motivation to scale their pulse energy. To increase the pulse energy of USP laser systems, the present technology may utilize a high efficiency medium amplifier, hereinafter referred to as ("HEM") to increase the pulse energy of the USP laser, upwards of 10 millijoules and beyond, without suffering from many of the deleterious effects seen in common laser systems.

The HEM concept is to significantly reduce fiber length by increasing the active rare earth ion concentration to achieve a proportional increase in gain per unit length. That is, by increasing a weight percentage concentration of rare earth ions within the gain media, the optimal length of the gain media may be reduced proportionally while increasing gain (e.g., amplification). The rare earth ion utilized may include Erbium, but one of ordinary skill in the art will appreciate that other ions or their combinations such as Ytterbium, Thulium, Titanium, Chromium, Neodymium, and Holmium may also likewise be utilized in accordance with the present technology.

While doping gain media such as silica or glass has been utilized in the past, historically, a ceiling on erbium concentration at about one-half percent weight has been imposed by clustering effects. Clustering effects may occur when the close spatial proximity of rare earth ions leads to cooperative energy coupling leading to transitions in the USP laser output that are parasitic to the laser efficiency. The breakthroughs presented by the present HEM technology include, but are not limited to, improved Erbium solubility in phosphate, or other non-silica, host glass (e.g., gain media) for greater than one percent weight Erbium concentration (in some embodiments) without clustering penalty. The present technology may facilitate overall amplifier engineering to sustain net optical efficiency beyond 65 percent using advanced pumping and mode control configurations in combination with HEM technology. The shorter path length and higher efficiency provided by HEM technology may increase pulse energy output by two orders of magnitude over the current ceiling imposed by system self-phase modulated amplifiers, as discussed in greater detail herein.

Non-silica based, rare-earth doped HEM optical amplifiers are effective to reach greater than 100 microjoules ($\mu J$), and up to millijoule levels, of compressed pulse energy and proceed to higher powers optimized for USP lasers. HEM fiber amplifiers of the present technology may impart multiple benefits to fiber USP laser systems. The HEM amplifiers may cause a reduction in green light emission due to a reduction in parasitic Erbium upconversion commonly seen in Erbium doped fiber ("EDF") amplifiers.

HEM fiber amplifiers utilizing phosphate-based, or other non-silica-based, gain media may be utilized to increase rare earth solubility without experiencing significant cluster effects. For example, Erbium doping concentration can be increased by greater than a factor of five in phosphate-based gain media relative to silica glass-based gain media.

The HEM fiber amplifiers of the present technology may enable practical USP laser capabilities at relatively high output levels. To date, to proceed above one millijoule to reach a goal of 10 millijoules or greater, optimized fibers—such as the present HEM amplifier fibers—may be utilized to meet the challenges of managing the high peak power of USP lasers in laser fiber architectures.

HEMs according to the present technology advantageously address fiber laser gain media issues that are not currently addressed by other systems. Current high power fiber USP laser architectures rely on existing silica-based fiber technology as their amplification medium. While this can be used effectively to about one millijoule of compressed pulse energy, to proceed to higher powers requires new fiber amplifier techniques that are optimized for USP lasers. USP laser amplifiers have a fundamentally different set of constraints versus longer pulse or continuous wave systems, and these constraints require alternative optimization directions, such as minimizing fiber length while preserving or increasing optical gain.

HEM fiber amplifiers of the present technology may result in multiple benefits to fiber ultrafast laser systems such as reductions of B-integral (self-phase modulation values), the key limiting factor for pulse amplification. HEM fiber amplifiers may also result in a reduction of size (up to a factor of four or more), weight (up to a factor of two or more) relative to commonly utilized fiber amplifiers, and power (fifty percent or other values) (also known as SWAP) demands on the USP laser assemblies due to increased efficiency in laser pumping. Additionally, HEM fiber amplifiers may increase laser output stability due to simplified amplifier architecture (e.g., shorter fibers).

In addition to employing HEM fiber amplifiers, the output pulse energy capability of USP lasers may also be increased by (1) increasing the effective mode area of optical fibers via high order mode ("HOM") propagation of the laser beam, and (2) adaptively compensating for much of the self-phase modulation (SPM) induced during high energy propagation via phase tailoring (such as active laser pulse phase and amplitude shaping).

Other means for increasing the capabilities of USP lasers include reducing the pulse compressor size, mass, and sensitivity to ambient conditions. The present technology may employ a monolithic, chirped Bragg grating (CBG) based compressor for 1.55 $\mu m$ wavelength (or other values such as 1 μm or 2 μm) chirped-pulse amplification ("CPA") systems in exemplary embodiments. Advantageously, these CBG systems may result in reduction in size (up to a factor of fifty or more) and reduction in mass (up to a factor of twenty or more) for the CBG compressor versus a Treacy pulse compressor.

Additionally, while HEM fiber amplifiers of the present technology may generate high gain laser pulses, the laser pulses produced are eye-safer in some embodiments. That is, the HEM fiber amplifiers may be utilized to amplify laser pulses in suitable wavelengths that are not deleterious to humans or other animals.

The efficiency of the HEM fiber amplifiers according to some embodiments of the present technology, may be quantified by calculation of an SPM equation, also known as the B-integral equation. This equation illustrates the coordinated benefits between of the HEM fiber amplifiers and the parallel USP laser performance scaling concepts described herein. As noted above, B-integral or self-phase modulation is a dominant pulse energy limitation, and it is inversely proportional to fiber mode field area (MFA), as shown by the equation:

$$B = \frac{2\pi}{\lambda} \int_0^L n_2 I(z) dz = \frac{2\pi}{\lambda A_{\it eff}} \int_0^L n_2 P(z) dz$$

In the SPM equation, $\lambda$ is the laser wavelength, $n_2$ is the nonlinear refractive index coefficient, $I(z)$ is the pulse peak irradiance along the propagation direction, $P(z)$ is the pulse peak power, L is the total fiber length, and $A_{\it eff}$ is the fiber effective mode area.

With respect to the above equation, assuming that the HEM amplifier may produce pulse energy of at least 100 μJ, 1 mJ or 10 mJ, the amplifier gain may be up to 10 dB, 20 dB, or 30 dB (or another number in some embodiments, and the fiber length L without HEM may be approximately two meters in length in some embodiments, or as short as a few centimeters. Generally speaking, operational characteristics for optimal performance (e.g., pulse quality) of an HEM amplifier relative to self phase modulation may include a B-integral of less than $2\pi$ radians for optimal pulse quality in some embodiments. Additionally, phase tailoring technology may compensate for approximately $5\pi$ radians of SPM in some embodiments. It is noteworthy to mention that above approximately $5\pi$ radians, pulse compressibility may become impractical.

To reduce the SPM of an optical amplifier, the following techniques may be employed. First, the fiber mode area of the amplifier may be increased by simply increasing the core size or by utilizing a HOM fiber to reduce the B-integral values. Increasing the fiber mode area allows for a reduction in the irradiance (optical power density) inside the fiber.

Next, fiber length, L, may be further decreased by employing a HEM fiber amplifier for a given effective mode area. That is, a fiber amplifier having a gain media that has been doped to include a concentration of rare earth ions that is at least one percent by weight may replace a corresponding conventional fiber amplifier having a relatively greater length.

In some instances, by employing the above-described techniques, the fiber length L may be reduced from approximately two meters to approximately one meter or less.

Additionally, surpassing the 10 mJ (millijoule) performance threshold may require leveraging the combined benefits of HEM, HOM, and phase tailoring technologies described herein. HEM optical amplifier of the present technology enables practical path for high power and high energy (e.g., greater than 100 microjoules compressed pulse energy) USP laser systems.

The HEM fiber amplifiers of the present technology may also support tandem pumping of pump wavelength close to the signal wavelength for high efficiency high power USP lasers, as well as various endcap technologies for HEM high power, high energy USP lasers.

In some embodiments, the HEM fiber amplifier may employ polarization maintaining fiber configurations for ultra-high pulse energy USP lasers with high degree of polarization (DOP). Non-limiting examples of polarization maintaining fiber configurations may include panda, bow-tie, and/or elliptical configuration, which will be described in greater detail infra.

Additionally, HEM amplifiers of the present technology may include micro-fiber arrangements for ultra-high pulse energy USP lasers. These micro-fiber arrangements may result in better/easier spatial/nonlinearity/dispersion management of USP laser output.

Figure 1:
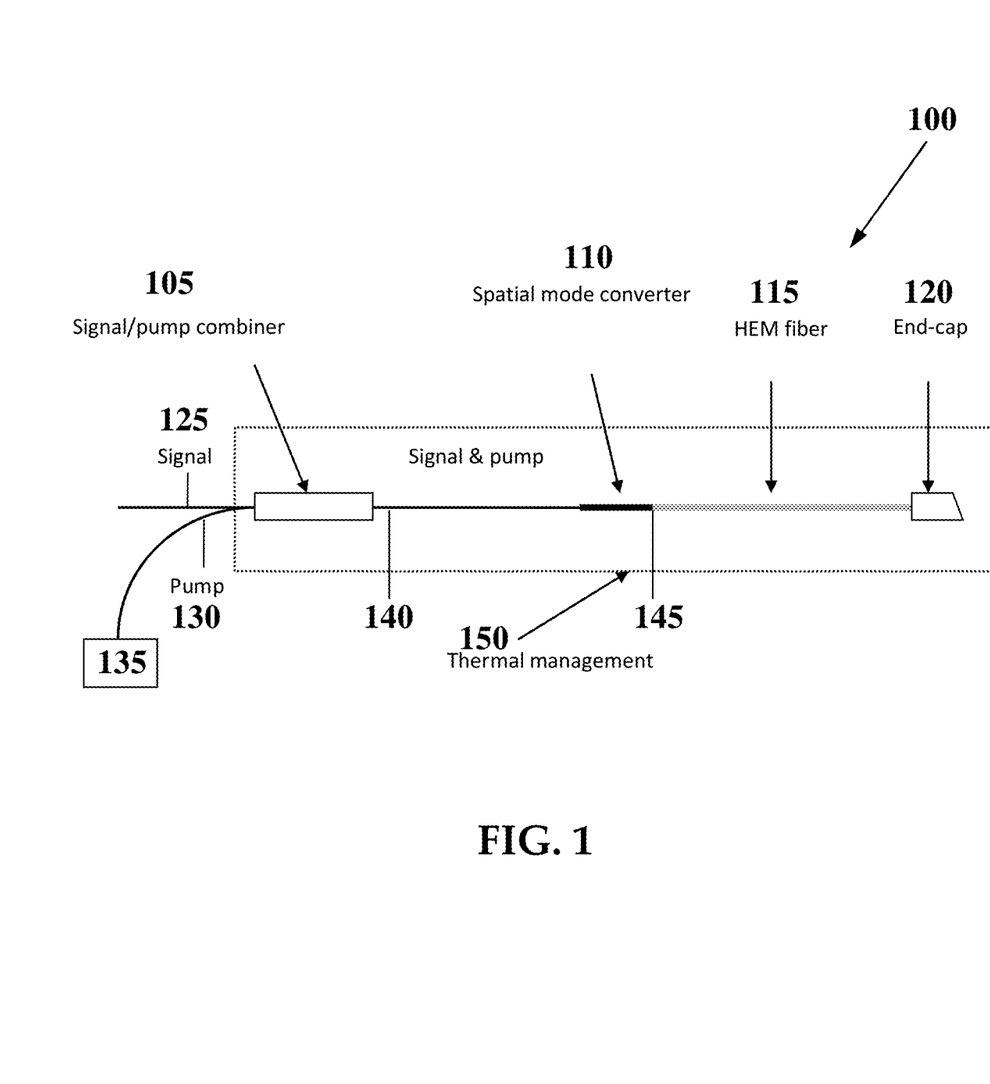
FIG. 1 is a schematic diagram of an exemplary ultrafast laser amplifier assembly having a high efficiency optical amplifier, for use in accordance with the present technology.

Turning now to the drawings, and in particular, to FIG. 1, an exemplary USP laser assembly, hereinafter "assembly 100" is shown therein. The assembly 100 is shown as generally including a signal and pump combiner 105, a spatial mode converter 110, a HEM fiber amplifier (hereinafter HEM 115), and an optional endcap 120.

The signal and pump combiner 105 multiplexes a signal 125 and a pump 130. The pump 130 may be understood to include high power continuous wave (CW) laser output generated by a semiconductor laser emitter or high power fiber laser 135. It will be understood that the semiconductor laser emitter or high power fiber laser 135 may comprise any one of a number of diode laser devices or fiber laser systems that are configured to generate high power or high brightness pump laser light. That is, the semiconductor laser emitter or high power fiber laser 135 may include any type of diode laser devices or fiber laser systems that can generate laser output having wavelength within the absorption bands of the active ions. In some embodiments, the signal and pump combiner 105 may be configured to multiplex a plurality of signals and pumps into a single laser beam or guided mode.

The signal and pump combiner 105 may receive both the signal 125 and the pump 130 via single mode fibers or multi mode fibers. The combiner 105 may output the multiplexed signal and pump laser output to a passive fiber 140. The passive fiber 140 may include a single mode silica-based fiber that provides an optical path for communicating both signal and pump laser output.

According to some embodiments, the combiner 105 may also utilize polarization maintaining wavelength division multiplexing to multiplex two or more laser pumps into a single laser pump output to increase the power of the pump laser output emitted from the combiner 105.

The spatial mode converter 110 may be utilized to convert the combined signal and pump laser output from a fundamental mode into another fundamental mode or higher order mode with larger effective mode area. This increase in mode may be due to the increased effective mode area of the spatial mode converter 110. According to some embodiments, the spatial mode converter 110 may include a passive large mode area fiber or long period grating (LPG) that transitions the combined signal and pump laser output from a fundamental mode to another fundamental mode (FM) or higher order mode (HOM). Exemplary large mode area fibers may include bundles of individual optical fibers that transmit the combined signal and pump laser output as it propagates through the converter 110. Large mode fibers may allow for multiple propagation modes for propagating the combined signal and pump laser output there through. Such bundles of fibers contrast with single mode fibers (also known as monomode or unimode) which generally include only a single core fiber that is at least partially surrounded by a cladding, buffer, and/or jacket material.

The spatial mode converter 110 may be developed directly on the high efficiency media amplifier. According to some embodiments, the spatial mode converter 110 may be a adiabatically tapered section at the signal input end to the large mode area high efficiency media amplifier. The tapered section may be directly spliced to a passive fiber with mode being matched to the signal output and/or pump output from the input passive fiber.

The spatial mode converter 110 may be spliced to the HEM 115 such that combined signal and pump laser output may propagate into the HEM 115 without substantial losses in the optical efficiency of the combined signal and pump laser output. Because the HEM 115 utilizes non-silica based gain media, such as phosphate, and the spatial mode converter 110 may utilize silica based passive fiber(s), the spatial mode converter 110 and HEM 115 may be spliced together utilizing a silica-to-phosphate splice 145. This splice may have different geometry required by optical amplification requirements. This splice may be a flat-cleaved splice or angle-cleaved splice, meaning the splice joined surfaces may or may not be normal to the longitudinal axis of the fiber.

Figure 2A:
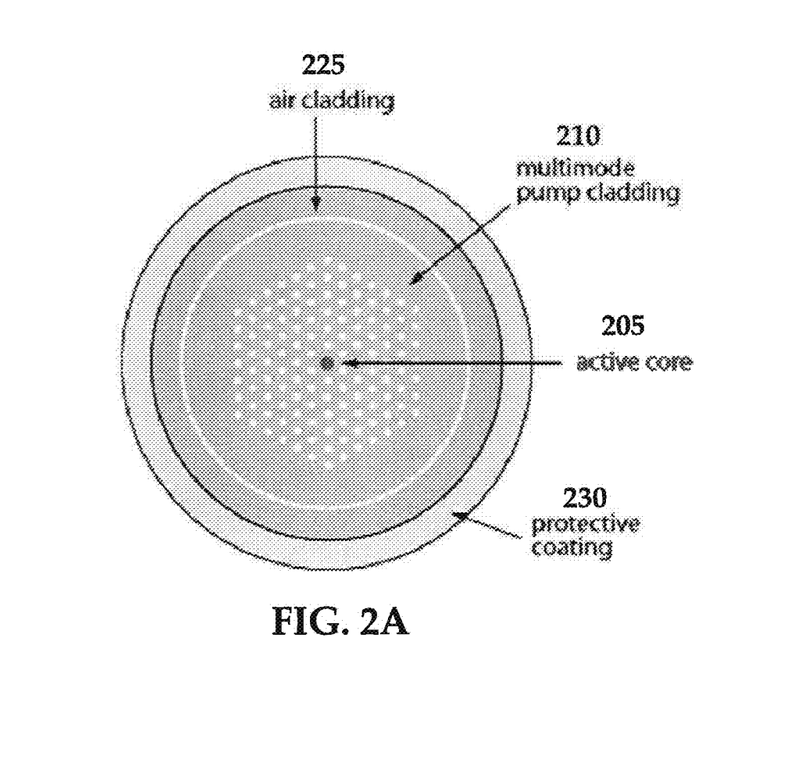
FIG. 2A is a cross-sectional view of an exemplary high efficiency medium (HEM) fiber amplifier.
Figure 2B:
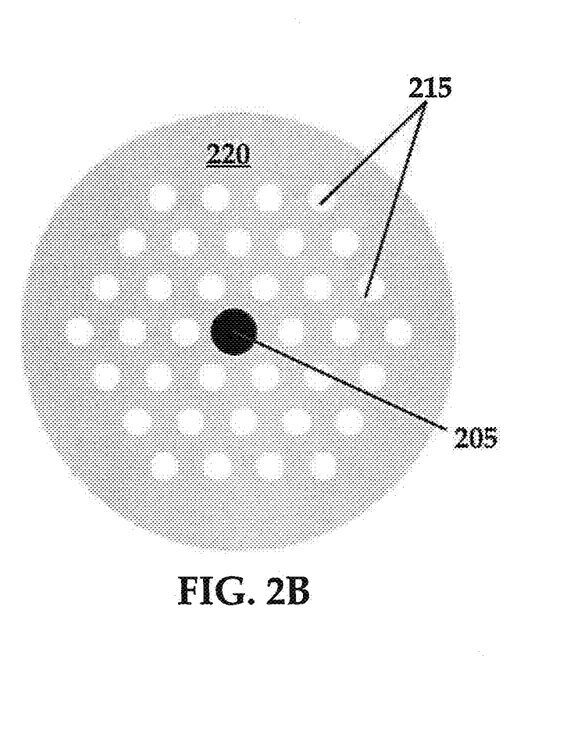
FIG. 2B is a partial cross-sectional view of a multimode pump cladding having an active core.

Referring now to FIGS. 1 and 2A-B collectively, the HEM 115 may include a large area non-silica based amplifier that has been doped to achieve a concentration of a rare earth ion within an active core 205. Because the active core 205 may be comprised of a non-silica based gain media such as a phosphate glass, the active core 205 may have a higher concentration of rare earth ions. This higher concentration is due, in part, to increased solubility of rare earth ions in phosphate-based gain media, relative to silica-based gain media. For example, the concentration of rare earth ions in the active core 205 may meet or exceed approximately one percent by weight. This is in contrast with silica-based gain media which are limited to approximately one half percent rare earth ions by weight. Limitations in doping of silica-based gain media stem from clustering effects of rare earth ions, which lead to parasitic energy loss in the form of spontaneous emission, self-lasing, cooperative up-coversion, stimulated optical scattering, and/or phonon coupling in the solid state medium.

Advantageously, doping phosphate based gain media substantially reduces clustering effects—where the non-uniform proximity of ions to one another—within the active core 205, which leads to a reduction in cooperative coupling of electron energy into transitions that are parasitic to laser efficiency.

The HEM may include a multimode pump cladding 210 that at least partially surrounds the active core 205. The cladding 210 may include a plurality of cylindrical optical paths 215 that extend through another passive media 220. The additional passive media 220 may include a silica-based or non-silica based material having a given effective refractive index lower than the refractive index of the active core. The optical paths 215 refract/reflect USP laser output emanating from the active core 205. The multi-mode pump cladding 210 may increase the effective mode area of the HEM 115 allowing for a substantial reduction in the overall length of the HEM 115.

Reductions in the length of the HEM 115 may advantageously reduce self phase modulation within the HEM 115.

The cladding 210 may also be at least partially surrounded by a cladding of air 225 that functions as an optical insulator. Additionally, the HEM 115 may include a protective coating 230 such as a jacket of polymeric material.

Figure 3A:
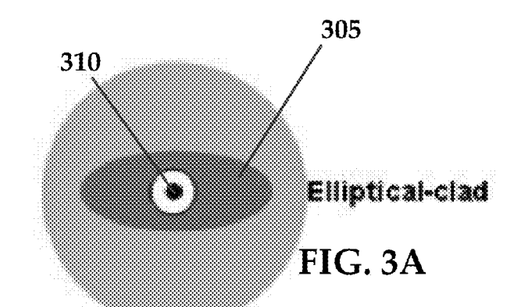
FIGS. 3A-C each illustrates various polarization maintaining (PM) fiber configurations having different cladding from one another, each of the configurations including a high efficiency gain medium, e.g., active core.
Figure 3B:
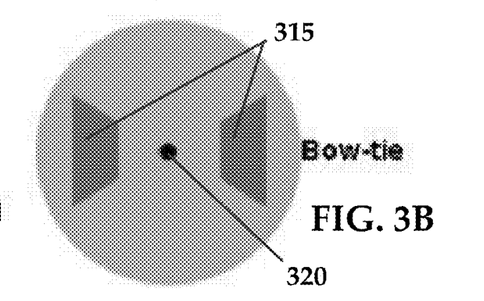
Figure 3C:
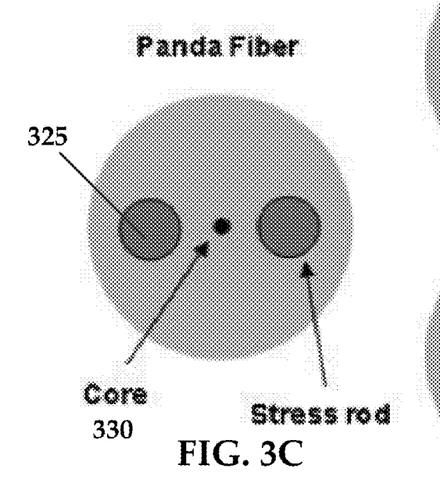

FIGS. 3A-C illustrate alternative cladding techniques for HEMS that may be utilized for maintaining the polarization of the USP laser output as it propagates through the HEM 115. Generally speaking, polarization maintaining fibers work by inducing stress in an active core via a non-circular cladding cross-section, or via rods of another material included within the cladding.

FIG. 3A includes an elliptical cladding 305 that surrounds an active core 310 (shown here as a single mode fiber). FIG. 3B illustrates a bow-tie cladding that includes a pair of elongated rectangular cladding plates 315 that are disposed away from an active core 320. These plates 315 extend along the length of the HEM and are spaced equidistantly from the active core 320 that is disposed therebetween. FIG. 3C illustrates a panda fiber configuration that includes a pair of cylindrical stress rods 325 that extend along the length of the HEM. These rods 325 may be spaced apart from an active core 330.

Returning back to FIG. 1, the HEM 115 may obtain a gain of at least 20 decibels with an active core diameter of at least 15 micrometers. The length of the HEM 115 may be reduced to at least one meter or less and may have an optical efficiency of at least 40 percent or greater when the doping of the active core 205 meets or exceeds one percent per weight. When the effects of the highly doped active core and HOM expansion are combined with active phase tailoring, the HEM 115 may achieve optical efficiencies of 65 percent or greater relative to silica-based gain media, which are constrained by self-phase modulation.

Additionally, the assembly 100 may include thermal management mechanisms 150 that ensure that the assembly 100 is operating at peak operational temperatures as thermal gradients can affect the output efficiency of the assembly 100.

Figure 4:
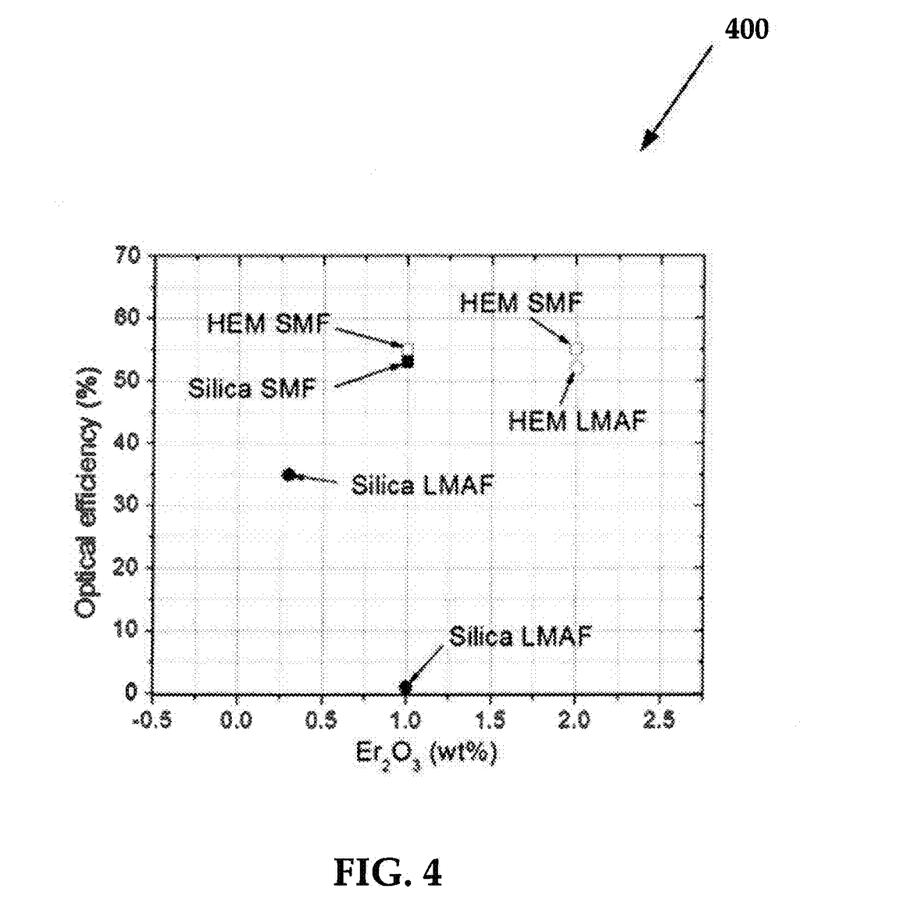
FIG. 4 is a graphical comparison of the performance characteristics of various high efficiency and non-high efficiency optical amplifiers with different rare-earth ions doping concentrations.

The comparative effects of the HEM, HOM and phase tailoring may be described with reference to FIG. 4. FIG. 4 is a graphical representation of the efficiency of different amplifiers relative to doping concentrations. As is shown, single mode silica fibers may be doped with up to 0.5 percent by weight concentrations of Erbium. Unfortunately, these single mode silica fibers suffer from excessive self phase modulation effects. Large mode area silica fibers with lower concentrations of Erbium (0.25 percent) are relatively inefficient as compared with purely single mode silica fibers. Unfortunately, increasing the Erbium concentration of large mode area silica fibers to one percent by weight results in almost no amplification. This effect is caused by excess clustering of Erbium ions within the silica.

In contrast with silica, non-silica based HEM fibers can achieve much higher concentrations of Erbium ions without suffering from a decrease in optical efficiency, as seen with silica-based fibers. As can be seen, HEM fibers, whether purely single mode or largemode area, operate at an optical efficiency that is greater than 50 percent.

Figure 5:
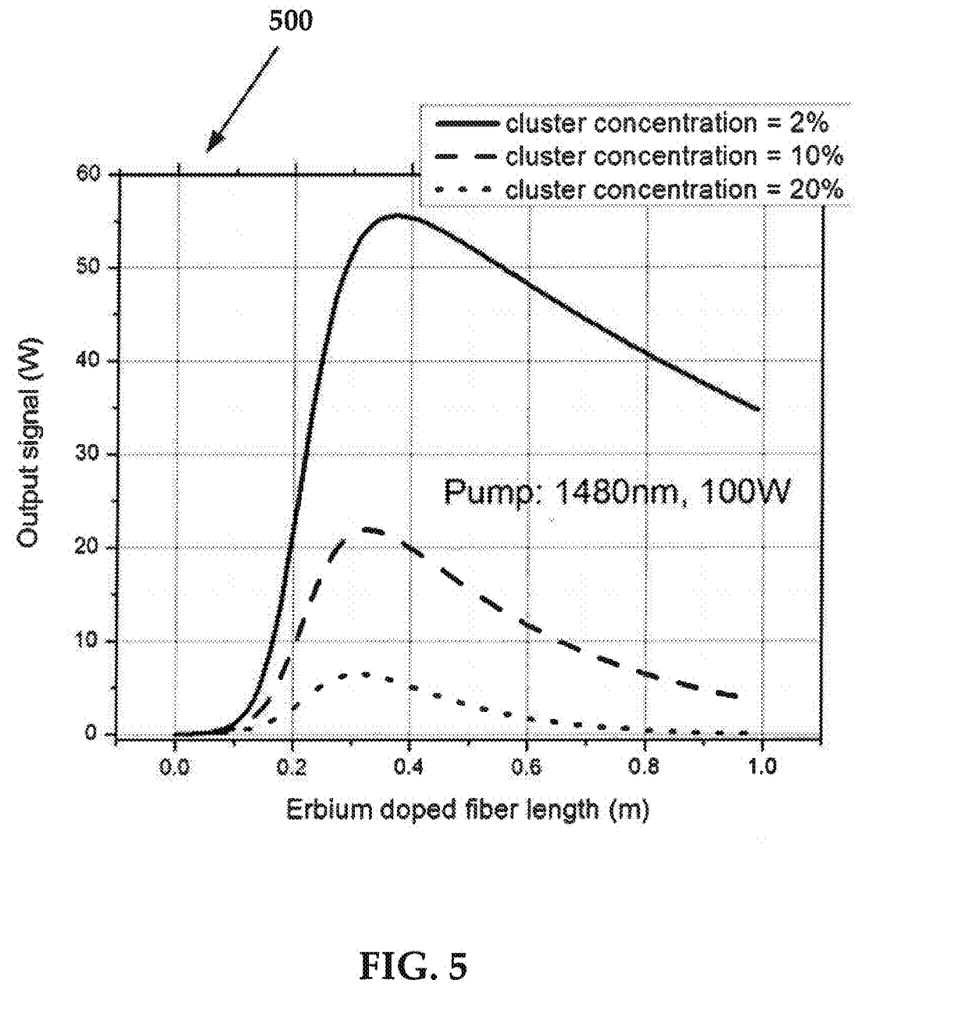
FIG. 5 is a graphical representation of the cluster effect of different concentrations of rare earth ions on laser output signal.

FIG. 5 is a graphical representation that illustrates the effect of cluster concentration of Erbium ions on the strength of the output signal as a function of fiber length. When cluster concentrations are minimized, such as at approximately two percent, with 100 W pump power at 1480 nm wavelength, the strength of the optical signal peaks at approximately 55 watts (W) when the length of the HEM fiber is less than 0.4 meters. As cluster concentration increases, it is clear that output signal strength is deleteriously affected such that at concentrations of ten percent, the output signal strength is only approximately 20 W, and at a cluster concentration of 20 percent, the output signal strength falls to less than 10 W.

Figure 6A:
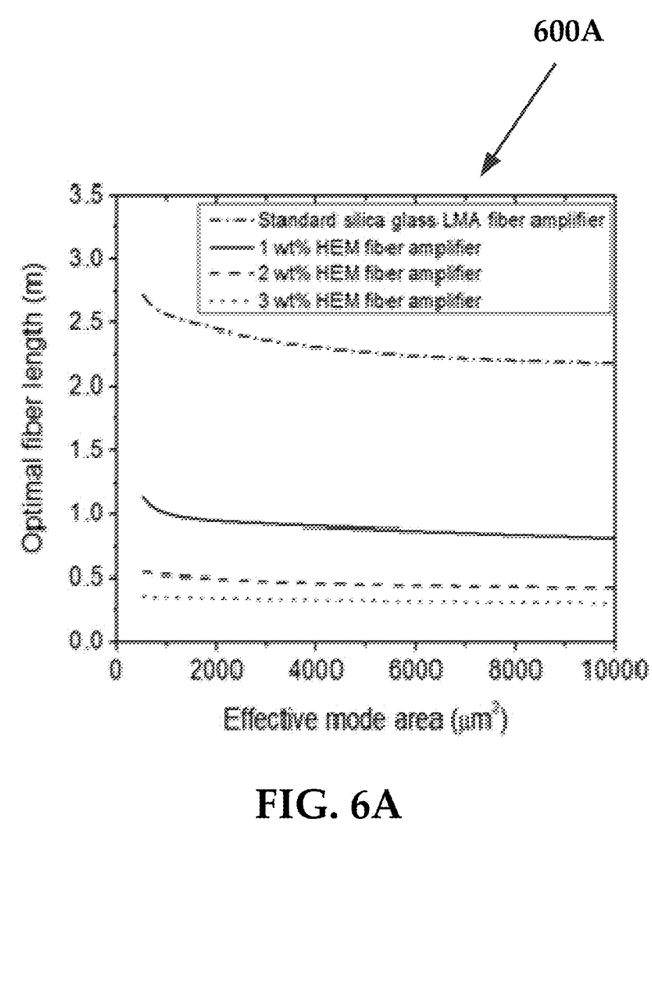
FIG. 6A is a graphical representation of the effect of rare earth ion concentration levels on optimal fiber length and effective mode area.

FIG. 6A is a graphical representation of the optical efficiency of silica-based LMA amplifiers relative to different HEM amplifiers. This graph measures the optimal fiber length as a function of effective mode area. As can be seen, the silica-based LMA fibers require much longer lengths (approximately two meters) as opposed to HEM fibers, which require generally less than one meter of total length. As Erbium concentrations within the HEM fibers increase, the optimal length of the HEM fiber may be decreased proportionally. This is due to the increase of the active ions density within the HEM fiber.

Figure 6B:
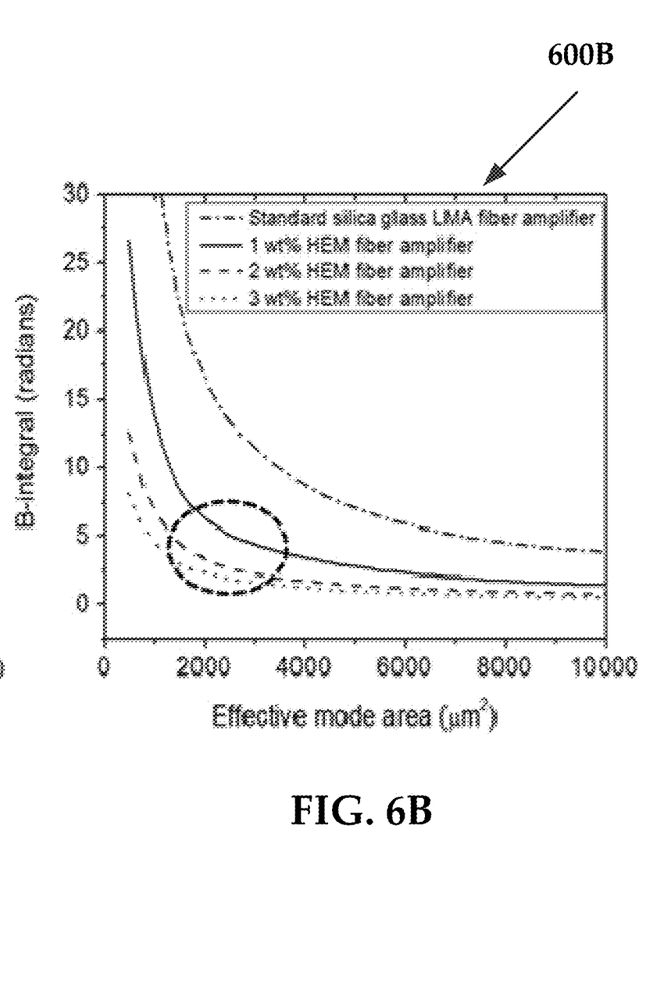
FIG. 6B is a graphical representation of the effect of rare earth ion concentration levels on self-phase modulation (as represented by B-integral values) and effective mode area for different amplifiers.

FIG. 6B is a graphical representation of reduction in self-phase modulation as a function of effective mode area, comparing silica-based LMA amplifiers relative to different HEM amplifiers having different doping concentrations. As can be seen, self-phase modulation may be decreased as doping concentration of non-silica based fibers is increased. The dotted ellipse shows the targeted effective mode area of a LMA HEM amplifier and its B-integral accumulation for one millijoule output pulse energy.

Figure 7A:
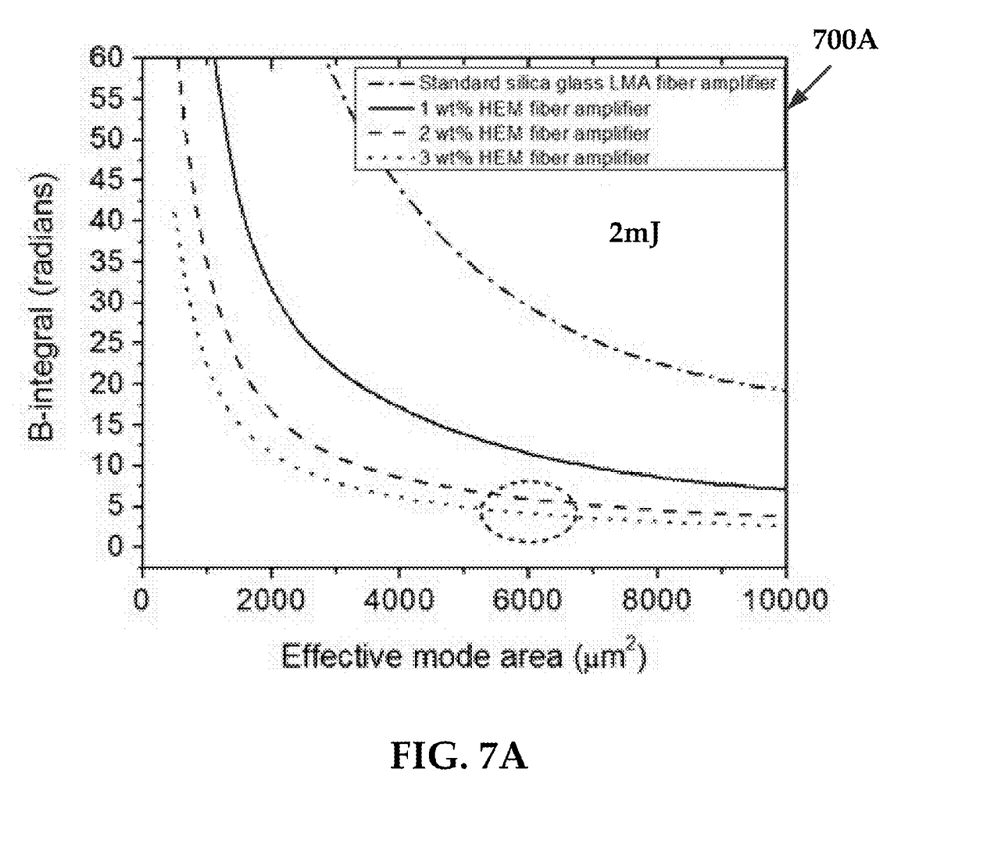
FIGS. 7A-C are graphical representations of the effect of rare earth ion concentration levels on self-phase modulation (as represented by B-integral values) and effective mode area for generating laser output signals at two millijoules, five millijoules, and 20 millijoules, respectively.
Figure 7B:
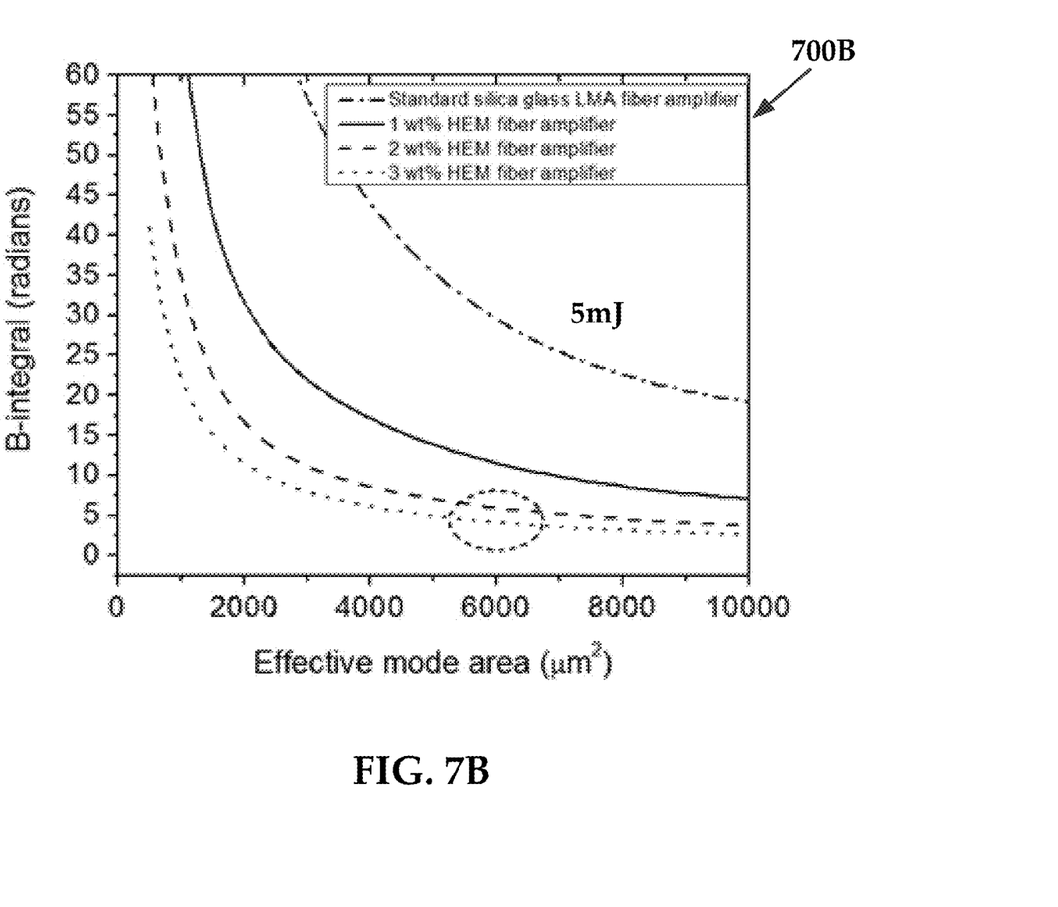
Figure 7C:
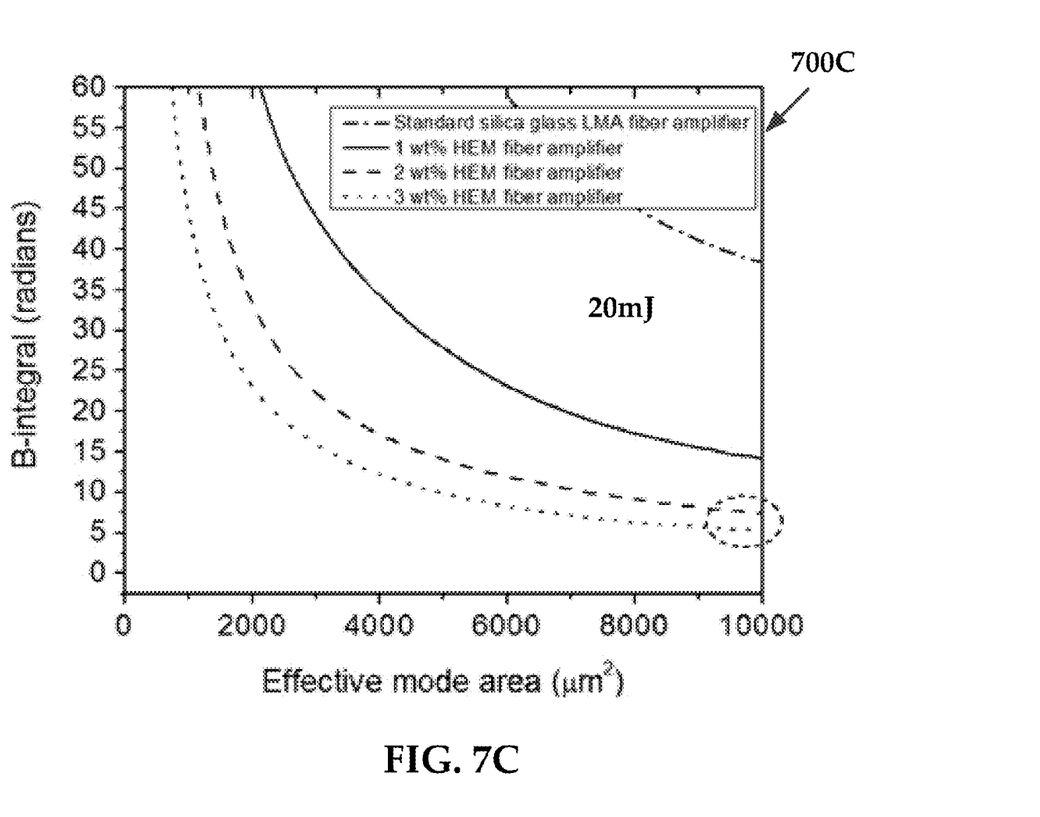

FIGS. 7A-C are graphical representations of reductions in self-phase modulation as a function of effective mode area, comparing a standard silica-based LMA amplifier to different embodiments of HEM amplifiers having different doping concentrations. Each of the graphs represents different output pulse energies. FIG. 7A illustrates that at an output pulse energy of 2 mJ, the targeted effective mode area is approximately 4000 square micrometers for HEM fibers that are doped to at least two percent by weight. FIG. 7B illustrates that at an output pulse energy of 5 mJ, the targeted effective mode area is approximately 6000 square micrometers for HEM fibers that are doped to at least two percent by weight. FIG. 7C illustrates that at an output pulse energy of 20 mJ, the targeted effective mode area is approximately 10,000 square micrometers for HEM fibers that are doped to at least two percent by weight.

Figure 8A:
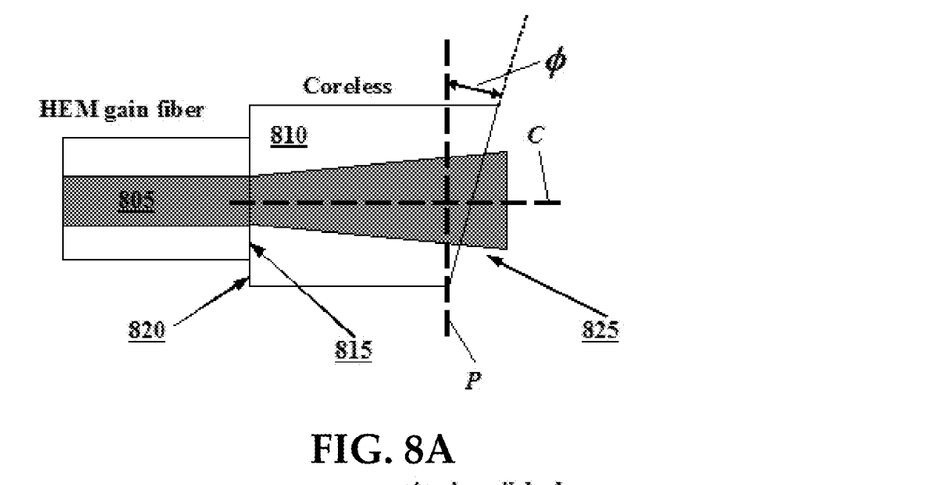
FIGS. 8A-C are perspective views of various mating configurations between the HEM amplifiers and endcaps.
Figure 8B:
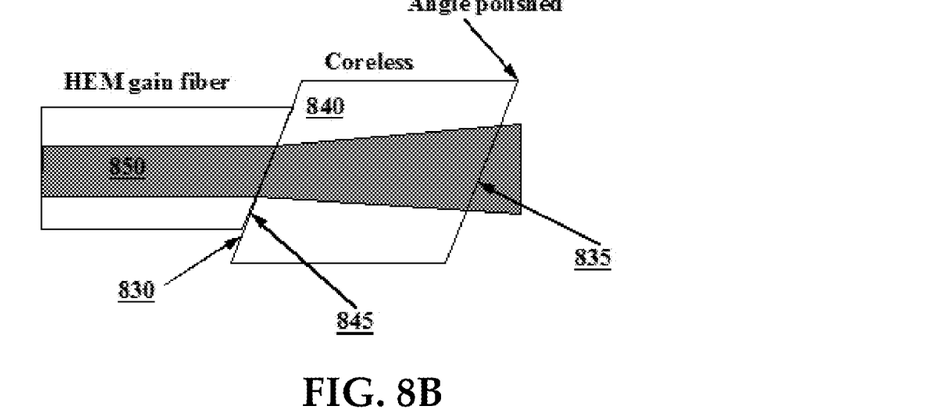
Figure 8C:
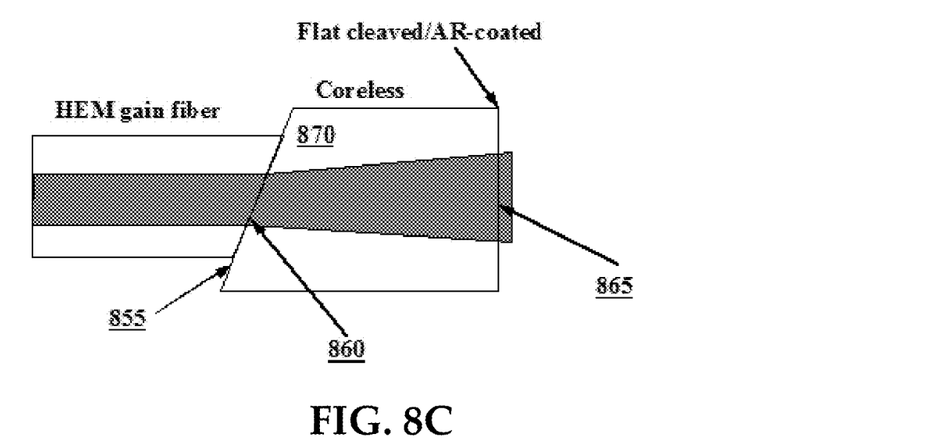

FIGS. 8A-C each illustrates various embodiments of endcaps as well as different mating configurations for joining a HEM amplifier with an endcap. An endcap, such as endcap 120 of FIG. 1, may be matingly associated with a terminal end of the HEM 115 to enlarge the USP laser output mode area that is emitted from the assembly 100 to avoid damage due to peak power density.

FIG. 8A is a perspective view of the joining of an HEM amplifier 805 and an angled endcap 810. The HEM amplifier 805 is shown as comprising a terminal end 815 having a substantially flat end surface that matingly engages with a substantially flat terminal end 820 of the angled endcap 810. According to some embodiments, an angled end 825 of the endcap 810 may include an angle θ that extends from a range of approximately zero to approximately 20 degrees, and preferably about eight degrees, relative to a reference plane P that extends perpendicularly to a central axis C of the endcap 810.

In FIG. 8B, both terminal ends 830 and 835 of an endcap 840 are angled, for example at approximately eight degrees. A terminal end 845 of the HEM amplifier 850 is angled to matingly engage the terminal end 830 of the endcap 840. It will be understood that creating an angle of the mating surfaces, with respect to the fiber cylindrical axis, between the HEM and the endcap may substantially reduce back reflection/refraction (e.g., decoupling) of USP laser output back into the HEM amplifier, which may lead to a decrease in the optical efficiency of the HEM amplifier. An angled terminal end 835 is used to further reduce back reflection/refraction (e.g., decoupling) of USP laser output back into the HEM amplifier. Terminal end 845 and terminal end 835 may or may not be parallel with each other.

In FIG. 8C, mating surfaces 855 and 860 are angled, but a terminal end 865 of an endcap 870 may be flat cleaved and may be provided with an anti-reflective coating to reduce decoupling.

While FIGS. 8A-C exemplify various embodiments of endcap and HEM mating angles, one of ordinary skill in the art will appreciate that mating surfaces having angles of varying degrees or geometrical configurations may likewise be utilized in accordance with the present disclosure.

Figure 9:
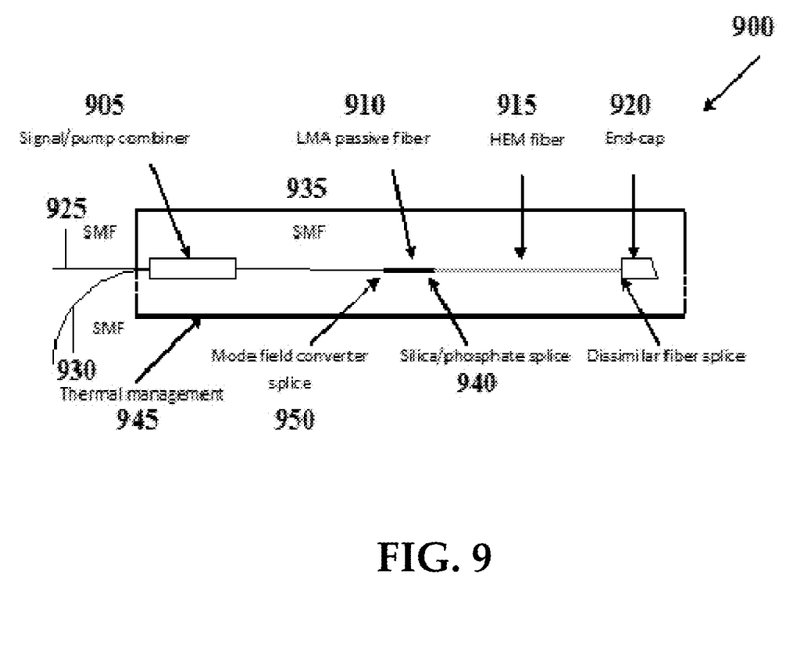
FIG. 9 is a schematic diagram of another exemplary ultrafast laser amplifier assembly having a HEM fiber amplifier, for use in accordance with the present technology.

FIG. 9 illustrates another exemplary USP laser assembly, hereinafter referred to as assembly 900. The assembly 900 may generally comprise a combiner 905, an LMA passive fiber section 910, a HEM amplifier 915 and an endcap 920. A signal may be communicated into the combiner 905 (which is similar to the combiner 105 of FIG. 1) along a single mode fiber line 925 and a pump may propagate along another single mode fiber line 930. The combiner 905 multiplexes the signal and pump into a single output that is communicated through another single mode fiber line 935 to the large mode area passive fiber section 910 for conversion into a large-mode output. A mode field converter splice 950 is used to join the single mode fiber line 935 to the large mode area passive fiber section 910.

Again, because the passive fiber section 910 may be manufactured from a silica-based material, a silica/phosphate splice 940 may be utilized to splice the passive fiber section 910 with the HEM fiber amplifier 915. A dis-similar splice may join the HEM amplifier 915 and the endcap 920.

Similarly to the assembly 100 of FIG. 1, the assembly 900 may include thermal management mechanisms 945 that ensure that the assembly 900 is operating at peak operational temperatures as thermal gradients can affect the output efficiency of the assembly 900.

Figure 10:
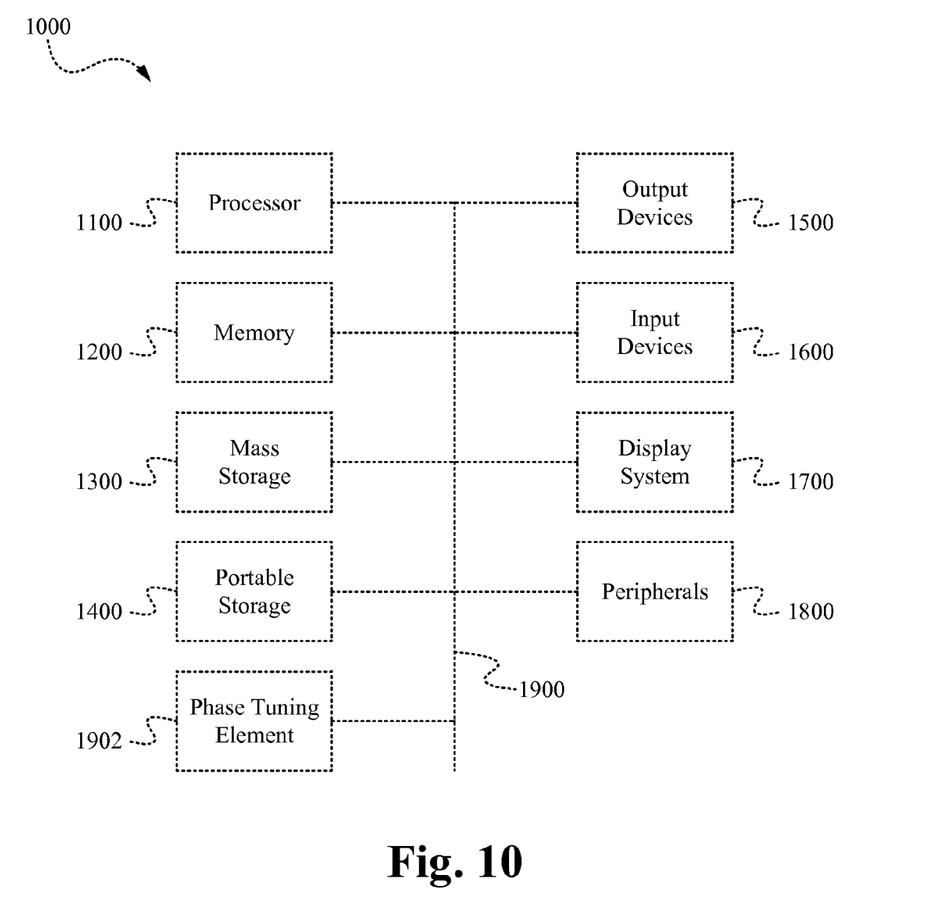
FIG. 10 illustrates an exemplary computing system that may be used to implement embodiments according to the present technology.

FIG. 10 illustrates an exemplary computing system 1000 that may be used to implement an embodiment of the present technology. The computing system 1000 may be utilized to implement several of the features of the present technology such as the selective phase tailoring 1902 of USP laser output. The computing system 1000 may include executable instructions that, when executed by a process of the computing system 1000, cause a pulse shaper or dispersion tuning elements to selectively adjust the phase and/or amplitude of the USP laser output. This selective phase tailoring 1902 of the USP laser output may be utilized to further reduce self-phase modulation as the USP laser output propagates through the HEM amplifiers of the present technology.

The computing system 1000 of FIG. 10 may be implemented in the contexts of the likes of computing systems, networks, servers, or combinations thereof. The computing system 1000 of FIG. 10 includes one or more processors 1100 and main memory 1200. Main memory 1200 stores, in part, instructions and data for execution by processor 1100. Main memory 1200 may store the executable code when in operation. The system 1000 of FIG. 10 further includes a mass storage device 1300, portable storage medium drive(s) 1400, output devices 1500, user input devices 1600, a graphics display 1700, and peripheral devices 1800.

The components shown in FIG. 10 are depicted as being connected via a single bus 1900. The components may be connected through one or more data transport means. Processor unit 1100 and main memory 1200 may be connected via a local microprocessor bus, and the mass storage device 1300, peripheral device(s) 1800, portable storage device 1400, and display system 1700 may be connected via one or more input/output (I/O) buses.

Mass storage device 1300, which may be implemented with a magnetic disk drive or an optical disk drive, is a non-volatile storage device for storing data and instructions for use by processor unit 1100. Mass storage device 1300 may store the system software for implementing embodiments of the present technology for purposes of loading that software into main memory 1200.

Portable storage device 1400 operates in conjunction with a portable non-volatile storage medium, such as a floppy disk, compact disk, digital video disc, or USB storage device, to input and output data and code to and from the computing system 1000 of FIG. 10. The system software for implementing embodiments of the present technology may be stored on such a portable medium and input to the computing system 1000 via the portable storage device 1400.

Input devices 1600 provide a portion of a user interface. Input devices 1600 may include an alphanumeric keypad, such as a keyboard, for inputting alpha-numeric and other information, or a pointing device, such as a mouse, a trackball, stylus, or cursor direction keys. Additionally, the system 1000 as shown in FIG. 10 includes output devices 1500. Suitable output devices include speakers, printers, network interfaces, and monitors.

Display system 1700 may include a liquid crystal display (LCD) or other suitable display device. Display system 1700 receives textual and graphical information, and processes the information for output to the display device.

Peripherals 1800 may include any type of computer support device to add additional functionality to the computing system. Peripheral device(s) 1800 may include a modem or a router.

The components provided in the computing system 1000 of FIG. 10 are those typically found in computing systems that may be suitable for use with embodiments of the present technology and are intended to represent a broad category of such computer components that are well known in the art. Thus, the computing system 1000 of FIG. 10 may be a personal computer, hand held computing system, telephone, mobile computing system, workstation, server, minicomputer, mainframe computer, or any other computing system. The computer may also include different bus configurations, networked platforms, multi-processor platforms, etc. Various operating systems may be used including Unix, Linux, Windows, Macintosh OS, Palm OS, Android, iPhone OS and other suitable operating systems.

It is noteworthy that any hardware platform suitable for performing the processing described herein is suitable for use with the technology. Computer-readable storage media refer to any medium or media that participate in providing instructions to a central processing unit (CPU), a processor, a microcontroller, or the like. Such media may take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a CD-ROM disk, digital video disk (DVD), any other optical storage medium, RAM, PROM, EPROM, a FLASHEPROM, any other memory chip or cartridge.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A method for amplifying laser pulses for ultra-short pulse laser output, the method comprising:
   receiving laser pulses;
   amplifying the laser pulses by propagating the laser pulses through a non-silica based gain medium that has been doped with a concentration of a rare earth ions, wherein the concentration of the rare earth ions within the gain medium is approximately greater than one percent by weight;
   phase tailoring the laser pulses to reduce self-phase modulation of the laser pulses during propagation of the same through the gain medium, wherein the phase tailoring includes at least one of active phase and amplitude shaping of the laser pulses; and
   generating an ultrafast pulsed laser output.

2. The method according to claim 1, further comprising propagating the laser pulses through a high order mode passive medium before and during amplification.

3. The method according to claim 1, further comprising input to a high efficiency medium amplifier, which includes a multiplexed combination of a signal and one or more pump laser beams.

4. The method according to claim 3, wherein the input to the high efficiency medium amplifier includes a pulsed signal laser output and a pump laser output that have wavelengths in tandem with one another.

5. The method according to claim 3, wherein the signal propagates in the core of the high efficiency media amplifier, and the pump propagates in the core of the high efficiency media amplifier, or in the clad of the high efficiency media amplifier, or in both the core and the clad.

6. The method according to claim 3, wherein the signal propagates in the core of the high efficiency media amplifier, and the pump propagates in the clad of the high efficiency media amplifier.

7. The method according to claim 3, wherein the signal propagates in the core of the high efficiency media amplifier, and the pump propagates in the both the core and the clad of the high efficiency media amplifier.

8. The method according to claim 3, wherein the signal and the pump co-propagate in the same direction of the high efficiency media amplifier.

9. The method according to claim 3, wherein the signal and the pump counter-propagate in the opposite direction of the high efficiency media amplifier.

10. The method according to claim 3, wherein the input to the high efficiency media amplifier includes a signal laser output and a first pump laser output with a wavelength of approximately 976 nanometers or 915 nanometers, and a second pump laser output with a wavelength of approximately 1480 nanometers or 1530 nanometers.

11. The method according to claim 3, wherein one or more of the pump lasers propagate in the core of the high efficiency media amplifier, and one or more of the pump lasers propagate in the clad of the high efficiency media amplifier simultaneously.

12. The method according to claim 1, wherein the ultrashort pulse laser output is amplified to at or above approximately 100 microjoules.

13. The method according to claim 1, wherein the ultrafast pulsed laser output is amplified to at or above approximately one millijoule.

14. A high efficiency optical amplifier, comprising:
an active core comprising a non-silica based gain medium, the gain medium being doped with a concentration of a rare earth ions, wherein the concentration of the rare earth ions within the gain medium is approximately greater than one percent by weight;
a phase tuning element selectively phase tailoring laser pulses to reduce self-phase modulation of an amplified ultra-short pulsed laser output during propagation of the same through the gain medium, wherein the phase tailoring includes at least one of active phase and amplitude shaping of the laser pulses; and
a cladding that at least partially surrounds the active core.

15. The amplifier according to claim 14, wherein the rare earth ions include erbium.

16. The amplifier according to claim 14, wherein the rare earth ions include thulium.

17. The amplifier according to claim 4, wherein the rare earth ions include holmium.

18. The amplifier according to claim 14, wherein the gain medium includes a phosphate host glass fiber having a given length.

19. The amplifier according to claim 18, wherein a length of the gain medium is less than approximately one meter.

20. The amplifier according to claim 18, wherein the length of the gain medium is selectively reduced by increasing the ion concentration for increased optical gain of the gain medium.

21. The amplifier according to claim 14, wherein the core includes a multimode core.

22. The amplifier according to claim 14, wherein the core includes a single mode core.

23. The amplifier according to claim 14, wherein the core includes a diameter of 15 micrometers or larger.

24. The amplifier according to claim 14, wherein the cladding includes a micro-structure such as photonic crystals and/or photonic bandgap structure.

25. The amplifier according to claim 14, wherein the cladding includes a polarization maintaining configuration.

26. The amplifier according to claim 14, wherein the cladding includes a non-circular shape.

27. The amplifier according to claim 26, wherein the cladding consists of symmetry-breaking elements such as air hole(s) and rods with material or refractive index different from the clad material and refractive index.

28. The amplifier according to claim 14, wherein the center of the core is offset to the center of the cladding.

29. The amplifier according to claim 14, wherein the cladding includes a multimode cladding.

30. The amplifier according to claim 14, further comprising an end cap that extends from a terminal end of the gain media, wherein the end cap expands the amplified ultra-short pulse laser output.

31. The amplifier according to claim 30, wherein the terminal end of the gain media and the end cap are angled, and further wherein surfaces of the terminal end of the gain medium and the end cap matingly interface with one another.

32. The amplifier according to claim 30, wherein a terminal end of the amplifier is angled from between approximately zero degrees to twenty degrees relative to a reference plane that is positioned perpendicularly to a central axis of the gain media, and wherein a terminal end of the end cap is correspondingly angled to reduce reflection of the signal and pump output from the amplifier.

33. The amplifier according to claim 30, wherein a terminal end of the end cap is anti-reflection coated to reduce reflection of the signal and pump output from the amplifier.

* * * * *